Oct. 17, 1972       J. E. McQUADE, JR       3,698,978
REGISTERED EMBOSSED HIGH PRESSURE LAMINATES
Filed April 22, 1969
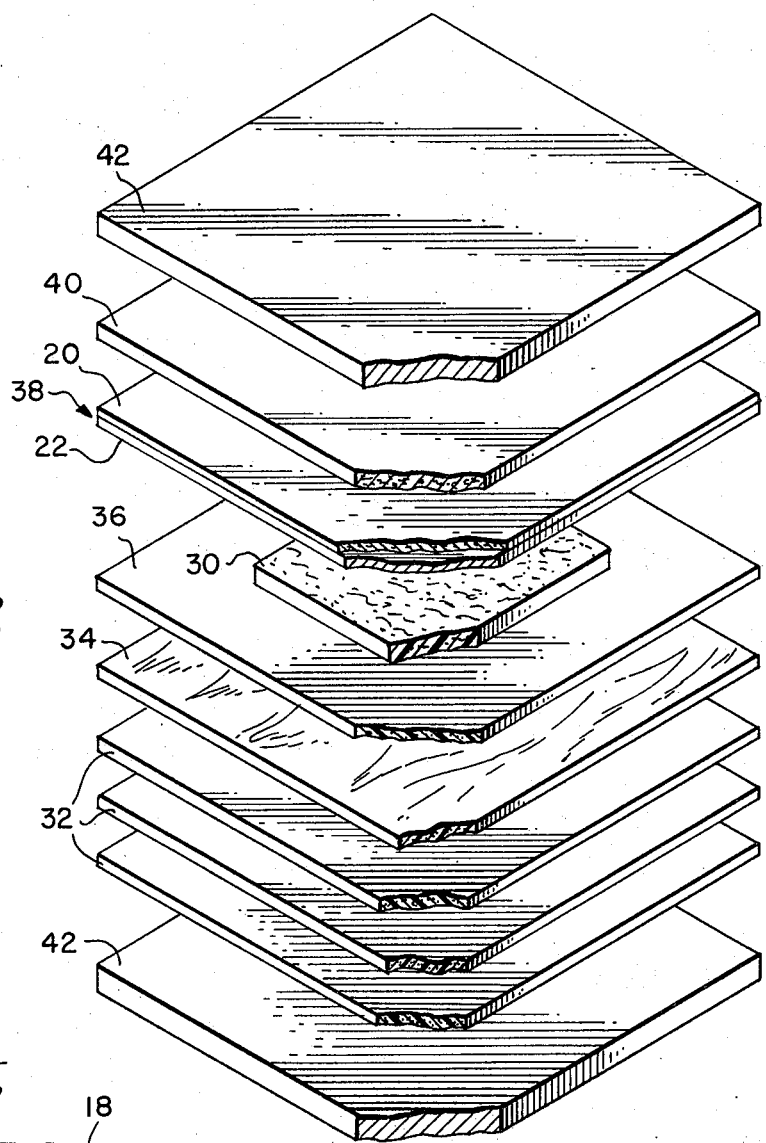
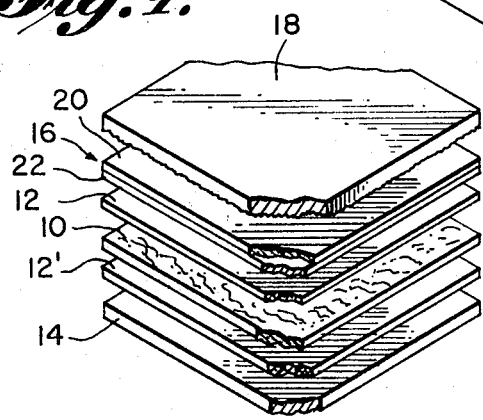
INVENTOR
JOHN E. McQUADE, JR.
BY  Karl W. Flocks
ATTORNEY

United States Patent Office 3,698,978
Patented Oct. 17, 1972

3,698,978
REGISTERED EMBOSSED HIGH PRESSURE LAMINATES
John E. McQuade, Jr., Baltimore, Md., assignor to Esso Research and Engineering Company
Filed Apr. 22, 1969, Ser. No. 818,292
Int. Cl. B32b 31/06, 31/12, 31/22
U.S. Cl. 156—219                    9 Claims

ABSTRACT OF THE DISCLOSURE

A process for the production of decorative textured and sculptured laminates having a first color and sculptured effect in one area in registry with the remainder of the laminate which has another color and a different texture.

---

The present invention relates to a high pressure decorative laminate, and more particularly, to a process for producing decorative laminates having contrasting surface configurations which are in exact registry.

The production of high pressure laminates is well known, having been carried out for many years. Generally, the procedures for forming such laminates involve providing phenolic resin impregnated paper core sheets and melamine resin decorative and overlay sheets and melamine resin decorative and overlay sheets and pressing the stacked resin impregnated sheets under heat on the order of 230°–310° F. and under pressure of approximately 1000–1600 p.s.i. until the resins have become thermoset, thereby providing an extremely hard, attractive and permanent surfacing material known as a "high pressure laminate" which has, for many years, found use as table tops, desk tops, counter tops, wall paneling, etc.

In the early years of the production of high pressure laminates, generally only glossy surface laminates were produced, though some attempts were made to provide laminates with some slight surface irregularity to give satin or textured finishes. The glossy surface was obtained by pressing resin-impregnated sheets between polished die plates under heat and pressure. In more recent years, it has become more desirable to provide various types of irregular surfaces, and these various irregular surfaces range from those having relatively shallow depressions, such as textured (e.g. satin, matte or semi-gloss) surfaces, to relatively deeply scultured surfaces which have a noticeable third dimensional effect, such as wood grain or simulated leather. With the rising cost of natural products, such as wood and leather, it has become even more desirable to provide irregularly surfaced high pressure laminates which simulate these natural products.

In many cases, it is desirable for special design effect to use two different high pressure type laminate configurations, one of which has one design and another of which has a second design. In many cases, one such laminate will be provided with a surface texture and the other will not, or they may both be provided with different surface textures. One example of such a special effect would be the production of a desk top having a simulated leather middle portion surrounded by a simulated wood periphery. Heretofore, such special effects have required fabrication techniques wherein two separate laminates are cut and fitted together in the proper manner; or special laminating die plates having varying surface configurations have been necessary, such die plates being extremely expensive. A further diffculty in this latter procedure is the problem of registration, it being necessary to carefully interfit the two dissimilar pattern sheets prior to laminating so that they not only can be aligned with one another, but also can be properly aligned with the special laminating die plate along the periphery of the special surface-configured area. This procedure is difficult, time consuming, expensive and has a high proportion of imperfectly formed products which must be discarded.

It is accordingly an object of the present invention to obviate or reduce the deficiencies of the prior art, such as indicated above.

It is another object of the present invention to provide a unitary high pressure laminate having registered, different patterned areas, in a simple and inexpensive manner.

It is another object of the present invention to provide a thin, preformed laminate which may be incorporated as an element in a second formed laminate, but which will not lose its surface characteristics during the second laminating procedure.

These and other objects and the nature and advantages of the instant invention will be more apparent from the following detailed description of certain embodiment of the invention, such description so fully revealing the general nature of the invention that others can, by applying current knowledge, readily modify such embodiments and/or adapt them for various applications without departing from the generic concept. Therefore, such adaptations and modifications should and are intended to be comprehended within the range of equivalents of the subject matter disclosed. The following detailed description of such specific embodiments will be more understandable taken in conjunction with the drawing wherein:

FIG. 1 is a schematic perspective view, partially broken away, showing a first stage in the production of a laminate in accordance with the present invention; and FIG. 2 is a schematic perspective view, partially broken away, showing the second stage in the production of a laminate in accordance with the present invention.

FIG. 1 shows assembling in the stack a fibrous print sheet 10, impregnated with a suitable thermosetting resin such as melamine resin (melamine-formaldehyde condensation product), surrounded on both sides with fibrous overlay sheets 12 and 12', also impregnated with suitable thermosetting resin, such as melamine resin. The three fibrous sheets 10, 12 and 12' are all preferably formed of alpha-cellulose in accordance with conventional practice. The print sheet 10 is provided with a suitable decorative print on its upper surface, in the illustrated embodiment, such printing being in the form of a leather-like coloring.

The die plate below the lower overlay 12' is a suitable metallic die plate 14, while placed above the upper overlay 12 is a separator sheet 16 and a sculptured die plate 18. The nature of the texture-imparting separator 16 may vary considerably, so long as its bottom surface is capable of releasing from the overlay 12 after completion of the first lamination. In the illustrated embodiment, the texture-imparting separator 16, intended to impart a medium gloss finish texture to the overlay 12, comprises a layer 20 of kraft paper bonded to aluminum foil 22, such a separator being used for only one lamination. On the other hand, a texture-imparting separator 16 may comprise various types of coated or impregnated papers which are known in the art and are available commercially, e.g., silicone resin impregnated paper. While the sculptured die plate 18 may be a metallic plate which has an etched embossing surface, it is preferred that a die plate of one of the types shown in the Michaelson et al. Pats. Nos. 3,303,081 and 3,311,520 be used, these die plates being themselves high pressure laminates having debossed surface irregularities in the desired pattern. This pattern, in the illustrated embodiment, simulates a leather surface.

The assembly is then cured under heat and pressure using conventional conditions as set forth above. An embossed high pressure laminate consisting of the print sheet 10 and the two overlays 12 and 12' is produced having an embossed surface pattern complementary to the debossed pattern of the sculptured die palte 18. If desired, either or both of the two overlays 12 and 12' may be eliminated, and the resultant laminate will be correspondingly thinner; or additional layers may be provided in which case the laminate will be thicker though this is not usually desirable.

The resultant thin laminate is then used in the process shown in FIG. 2 and describe below. While the laminating operation of FIG. 1 may produce the thin laminate in its desired ultimate peripheral (or annular, etc.) configuration, it is preferred to form such laminates in standard size and then cut such thin laminate to its desired size and shape configuration for use in the process of FIG. 2.

Moving on the FIG. 2, the resultant thin laminate of the process of FIG. 1, after having been cut to the desired size and shape, is utilized as an element in a further laminating procedure as a textured inlay 30 having a suitably embossed or sculptured upper surface. In the illustrated embodiment, a desk top is produced having a center of simulated leather surrounded by a periphery of simulated wood. Accordingly, the textured inlay, produced according to the process of FIG. 1, has a coloring and surface sculpturing which simulates leather, while in the finished laminate, produced according to the process of FIG. 2, the surrounding periphery will have the appearance of wood. Of course, it should be understood, that many variations are possible in accordance with the present invention, e.g., the textured inlay might comprise the periphery instead of the center of the final laminate, various different types of textured inlays might be used adjacent one another, or in various positions in final laminate, or a suitably dense and resistant material not made according to the process of FIG. 1 might be used in place of the sculptured laminate inlay.

An assembly or lay-up of conventional nature is stacked below the textured inlay 30 in the process of FIG. 2, and this conventional assembly comprises a plurality of fibrous sheets 32, impregnated with a thermosetting resin such as phenolic resin (phenol-formaldehyde resin), normally referred to as "core" sheets, a resin impregnated fibrous print sheet 34 carrying the printed design or color intended to be imparted in the final product, and a fibrous overlay sheet 36. In accordance with conventional practice, the print sheet 34 and the overlay sheet 36 are preferably formed of alpha-cellulose and are impregnated with melamine resin. In the illustrated embodiment, the print sheet 34 carries a wood grain print on its surface.

As is seen from FIG. 2, the textured inlay 30 is then placed in suitable location over the overlay 36. On top of the textured inlay 30 and the overlay 36 is located a suitable texture-imparting separator sheet 38 which may be the same as the texture-imparting separator 16, i.e., it comprises a laminate of aluminum foil 22 on the under surface and paper 20, such as kraft paper, on the upper surface. However, as with the texture-imparting separator 16, various other types of texture-imparting separators may be used depending upon the nature of the desired surface texture in the final laminate.

Immediate above the texture-imparting separator 38 is located a suitable cushioning material 40. The cushioning material may be ordinary kraft sheet or uncured resin impregnated overlay. Overlay is preferred because it is better able to conform to the high pressure deformations encountered during the pressing cycle. However, other sheets of similar density and resiliency may also be used. Suitable die plates 42, such as polished metallic plates, are then used on both sides of the assembly to effect the necessary pressing, which is carried out under conventional conditions as indicated above.

During the pressing cycle, the pre-cured inlay 30 is pressed into the base laminate being formed (into the overlay 36, the print 34, and the core sheets 32) and it is adhered thereto by the bonding action of the melamine resin in the overlay 36. The resultant laminate has a center portion corresponding to the textured inlay 30, while the peripheral portion is provided with the design of the print layer 34 and the surface texture imparted by the texture-imparting separator 38. In the case where the separator 38 is, as illustrated, a kraft paper aluminum foil laminate, the texture imparted to the peripheral portion of the laminate carrying the wood grain design of the print 34 will be a medium gloss finish.

Due to the placement of the cushioning material 40, as shown in FIG. 2, and because the inlay 30 is pre-cured, it is surprisingly found that the embossed inlay 30 retains its original texture and color in spite of the severe conditions of heat and pressure to which it is subjected. Any combination of base laminate and pre-cured inlay are possible with the result being a high pressure laminate incorporating areas with contrasting color and texture in exact registration.

The following examples, offered for purposes of further illustration without limitation, will more fully reveal the nature of the invention.

EXAMPLE 1

An assembled stack as shown in FIG. 1 is provided using a die plate 18 having a leather producing sculptured surface, a red dyed print layer 10, and a separator 16 comprising silicone-treated parchment paper. The assembly is pressed at 1000 p.s.i. at about 300° F. for about twenty minutes. The resultant thin laminate has a dead matte finish produced by the silicon treated parchment, and is embossed with a leather grain sculpture. The thin laminate looks like a piece of red leather.

The thin embossed laminate is then cut to desired size, and is assembled in a stack such as shown in FIG. 2 as the embossed inlay 30. The print layer 34 corresponds to simulated wood in a mahogany grain and color. The separator 38 is, as shown in FIG. 2, a kraft paper aluminum foil laminate. The assembled pack is pressed at 1000 p.s.i. at about 300° F. for about twenty minutes until all the elements are consolidated and cured. The inlay 30 in the resultant product is pressed into the surface of the laminate and retains its red leather appearance. The periphery, having a simulated mahogany appearance, is provided with a medium gloss texture by the texture imparting the separator 38 due to variation in density in the kraft paper backing 20. The registration of the embossed inlay 30 with the wood grain pattern is exact, and does not require any careful alignment of components or matching of registration marks.

EXAMPLE 2

A procedure similar to that of Example 1 is carried out except that in the process of making the embossed inlay 30, only a print layer 10 is used. In addition, a texture-imparting separator 16 consisting of a kraft paper aluminum foil laminate is provided so that the embossed inlay has a medium gloss finish, and the printed sheet is provided with an olive green color. The resultant laminate is provided with a diamond-shaped hole in the middle thereof. The inlay is then used in the laminating procedure of FIG. 2 in accordance with Example 1 above. The resultant laminate comprises an olive green simulated leather (embossed) peripheral surface, while the center thereof in a diamond-shaped pattern has a simulated appearance of wood. Both portions, in exact registry, have a textured medium gloss finish.

It is to be understood that the invention is not limited to the embodiments disclosed which are illustratively offered, and that modifications may be made without departing from the invention. For example, the fibrous sheets may comprise materials other than paper, such as fabric or fibrous glass mats.

What is claimed is:
1. A method of forming a unitary, registered, embossed high-pressure laminate comprising:
   providing a thin, flat, dense, resistant and embossed inlay formed by molding a thermosetting resin;
   assembling in a stack from the bottom up (1) a plurality of fibrous sheets impregnated with thermosetting resin, (2) said embossed inlay having a size and shape different from and essentially smaller than said fibrous sheets, (3) a texture imparting separator corresponding in size to said fibrous sheets and having a surface texture capable of being impressed into the upper most of said fibrous sheets with said surface texture adjacent said embossed inlay, and (4) a cushioning sheet overlying at least said embossed inlay;
   applying to the upper and lower surfaces of said assembly approximately 1,000–1,600 p.s.i. pressure at a temperature on the order of 230–310° F. to produce said unitary, high pressure laminate by effecting lamination of said fibrous sheets with said embossed inlay, forcing said inlay into said fibrous sheets and imparting the surface texture of said texture imparting separator to the upper surface of said uppermost fibrous sheet in areas other than that covered by said embossed inlay and without affecting the embossing on said inlay; and
   stripping from said resultant high-pressure laminate said texture imparting separator and said cushioning sheet thereby providing the unitary, high pressure laminate having on the upper surface thereof two different textures, one texture being that of the embossed inlay and the other being said imparted surface texture.

2. A method in accordance with claim 1, wherein said resin impregnated fibrous sheets comprise phenolic impregnated core sheets, a melamine resin impregnated alpha-cellulose print sheet thereover, and an upper melamine impregnated alpha-cellulose overlay sheet.

3. A method in accordance with claim 1 wherein said texture imparting separator is selected from the group consisting of a laminate of paper and aluminum foil and a silicone resin impregnated paper sheet.

4. A method in accordance with claim 1, wherein said cushioning sheet comprises a sheet of paper.

5. A method in accordance with claim 1, wherein said embossed inlay comprises a high pressure laminate.

6. A method in accordance with claim 5, wherein said laminated inlay is formed of at most three resin impregnated fibrous sheets.

7. A method in accordance with claim 6, further comprising, as a preliminary operation, forming said laminated inlay by pressing said at most three resin impregnated fibrous sheets together under high pressure laminating conditions using a sculptured die plate and a texture-imparting separator.

8. A method in accordance with claim 7, wherein only one of said at most three resin impregnated fibrous sheet is used, said sheet being a melamine resin impregnated print sheet.

9. A method in accordance with claim 7, wherein three of said at least three resin impregnated fibrous sheets are used, the middle of said sheets being a melamine resin impregnated print sheet and the upper of said sheets being a melamine resin impregnated overlay sheet.

References Cited
UNITED STATES PATENTS

| | | | |
|---|---|---|---|
| 3,303,081 | 2/1967 | Michaelson et al. | 156—219 |
| 3,311,520 | 3/1967 | Michaelson et al. | 156—209 |
| 3,373,068 | 3/1968 | Grosheim et al. | 156—219 |
| 2,545,286 | 3/1951 | Kessler | 156—223 |
| 3,212,542 | 10/1965 | Miller et al. | 156—298 X |
| 3,294,622 | 12/1966 | Wark | 156—222 X |
| 3,345,248 | 10/1967 | Pounds et al. | 161—413 X |
| 3,418,189 | 12/1968 | Grosheim | 161—413 X |
| 3,526,558 | 9/1970 | Beeson | 156—209 X |

FOREIGN PATENTS

| | | | |
|---|---|---|---|
| 654,645 | 1951 | Great Britain | 156—288 |

CARL D. QUARFORTH, Primary Examiner

R. S. GAITHER, Assistant Examiner

U.S. Cl. X.R.

156—182, 196, 220, 222, 223, 228; 161—5, 413